J. C. HECKMAN.
PROCESS OF CALCINATION.
APPLICATION FILED NOV. 11, 1907.

922,425.

Patented May 18, 1909.
2 SHEETS—SHEET 1.

WITNESSES.

INVENTOR.

UNITED STATES PATENT OFFICE.

JOSEPH C. HECKMAN, OF ALLEGHENY, PENNSYLVANIA, ASSIGNOR OF ONE-HALF TO WILLIAM J. GILMORE, OF PITTSBURG, PENNSYLVANIA.

PROCESS OF CALCINATION.

No. 922,425.      Specification of Letters Patent.      Patented May 18, 1909.

Application filed November 11, 1907. Serial No. 401,703.

*To all whom it may concern:*

Be it known that I, JOSEPH C. HECKMAN, a resident of Allegheny, in the county of Allegheny and State of Pennsylvania, have invented a new and useful Improvement in Processes of Calcination; and I do hereby declare the following to be a full, clear, and exact description thereof.

My invention relates to a process of calcination.

In the calcination of certain ores or other substances said substances are diluted with a certain proportion of water and of sulfuric acid so that a thin and often a freely flowing liquid results. In order to bring this diluted substance into proper form for introduction into the calcining furnace it has been customary heretofore to introduce the liquid into evaporating pans and by the application of a certain amount of heat create evaporation which left the substance in a dry or semi-dry condition. After this evaporation has taken place the substance was removed from said pans and then introduced into a suitable calcining furnace where it was subjected to a high heat for some times a period of 72 hours before the material was properly calcined.

The object of my invention is to dispense with this preliminary evaporation of the liquid, by evaporating and calcining at one operation, which greatly reduces the amount of time, labor and heat heretofore required for calcining a substance in a diluted or liquid form.

In the accompanying drawings I have illustrated a suitable furnace or muffle for carrying out my invention, in which—

Figure 1:
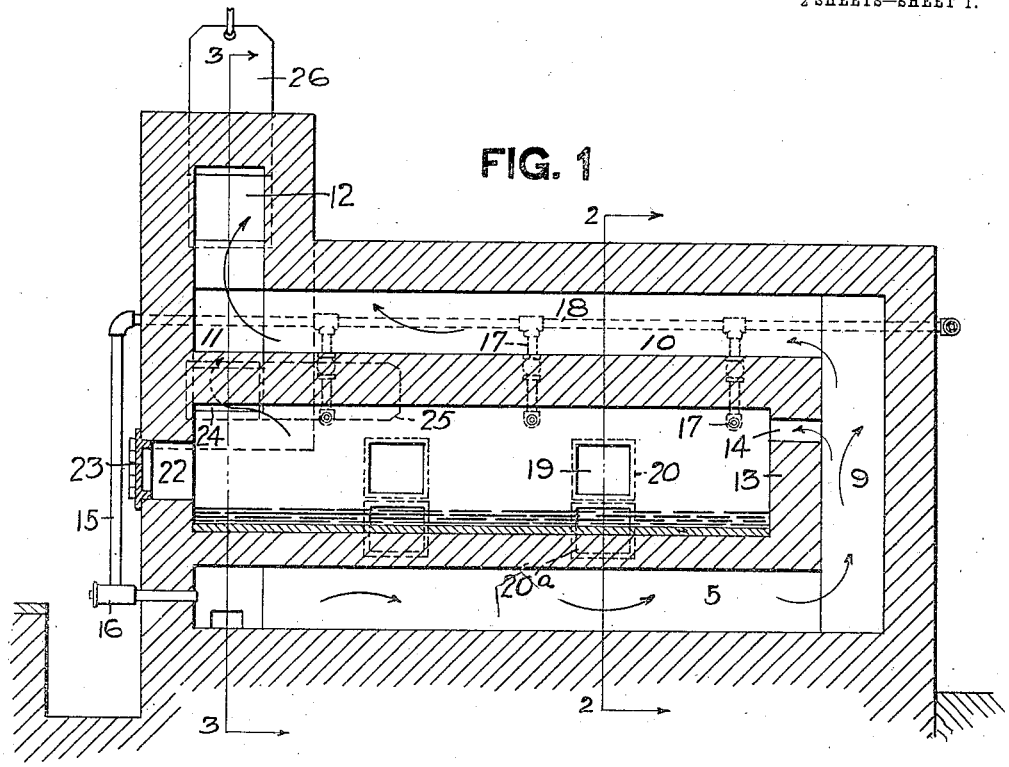
Figure 2:
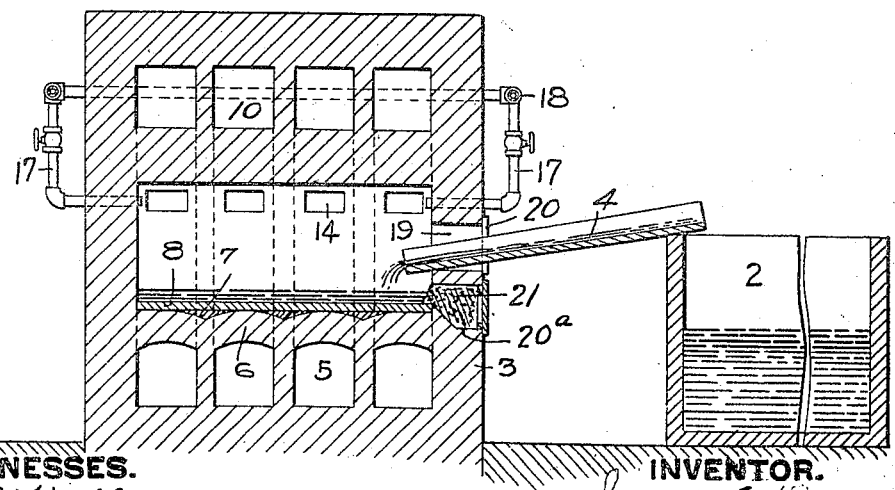
Figure 3:
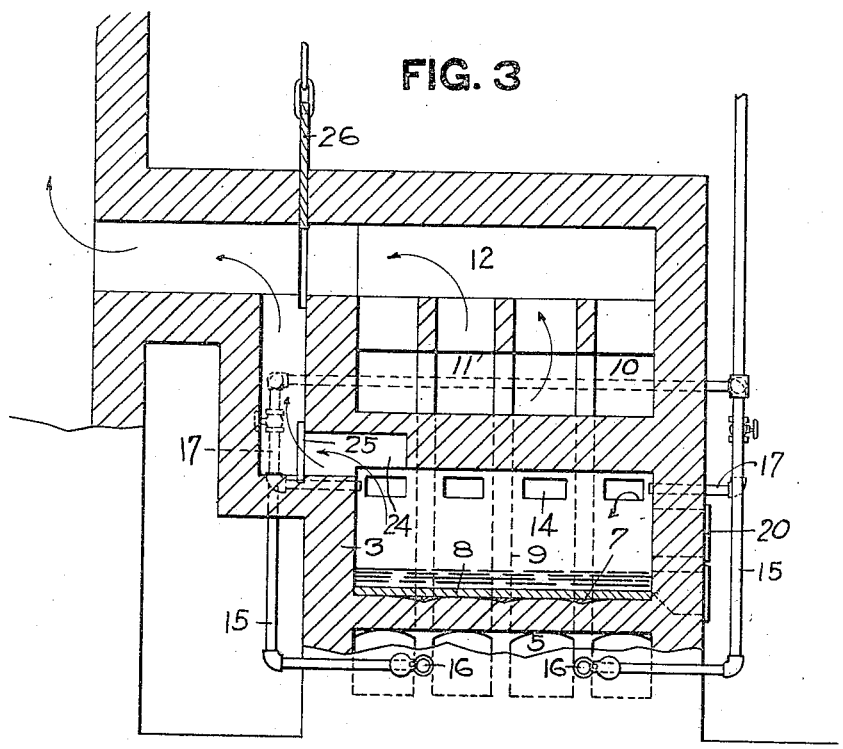
Figure 4:
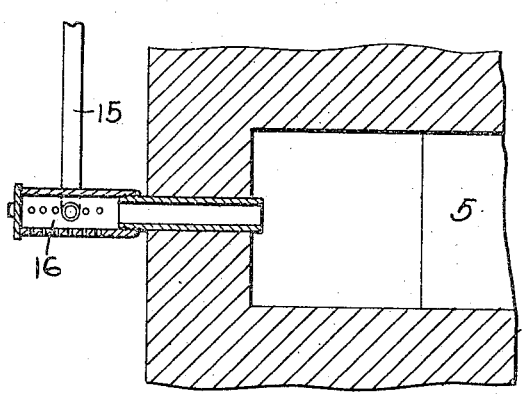

Figure 1 is a longitudinal sectional elevation of same; Fig. 2 is a cross section on the line 2—2 Fig. 1; Fig. 3 is a cross section on the line 3—3 Fig. 1; and Fig. 4 is an enlarged detail.

As above stated, in the extraction of certain metals from their ores to form oxids of such metals it is necessary to dilute the ores with a certain amount of water and sulfuric acid, and by way of illustration I will refer to the production of a pigment made of furnace flue-dust, according to an application filed by me on the 12th day of June, 1907, Serial No. 378,655. In the manufacture of this pigment I take the ordinary furnace flue dust which is a refuse from blast furnaces, and mix the same with certain proportions of water and sulfuric acid until the same is diluted or in liquid form. This mixture is contained in a suitable vat 2 located adjacent to the furnace 3 so that the liquid lifted by a dipper may be introduced into the spout 4 to be conveyed into the furnace 3. This furnace 3 is built of fire brick and is provided with a series of flues 5 extending from the front to the rear end of said furnace. The space between the arches 6 is filled in with clay or other suitable material 7 to form a level surface, and on the top of the same is laid a floor 8 of brick of suitable refractory material laid in asbestos cement. The flues 5 communicate at their rear ends with the vertical flues 9 and said vertical flues 9 in turn communicate with the horizontal return flues 10 which communicate with the cross flue 11 communicating with the flue 12 leading to the stack. Formed in the rear wall 13 are the ports 14 which form communication between the vertical flues 9 and the muffle-chamber. The gas pipes 15 communicate with the mixers 16 and the air and gas are admitted to the flues 5 where combustion takes place. Gas pipes 17 lead from the main 18 to the muffle chamber at or adjacent to the ceiling thereof.

The openings 19 are provided in the side wall of the furnace for the introduction of the substance to be calcined and said openings are provided with the doors 20. The openings 20ª extend down flush with the bottom 8 of the muffle chamber and these openings are filled up to a certain height with the clay or other material 21 which may be readily broken down or removed when it is desired to withdraw the material after it has been calcined.

The front of the furnace is provided with the opening 22 closed with the door 23 for the purpose of introducing the stirrer or scraper to work the material during the process of calcination. This opening 22 is above the floor level of the muffle chamber and in this manner a basin or reservoir is formed to receive the liquid and prevent its escape.

A flue 24 leads from the front end of the muffle chamber into the flue 12 and said flue is controlled by the damper 25. A damper 26 is employed to control the flue 12.

In carrying out my process with the above described furnace or muffle, the gas is turned on at the pipes 15 and ignited, whereupon the furnace is heated up to a high degree of heat which requires some hours. This heats the muffle chamber up to a high temperature, the bricks of the floor 8 being practically at a white heat. When the proper degree of heat has been reached the diluted flue-dust is then dipped from the vat 2 and passes by the spout 4 into the muffle chamber. The material flows readily down the spout 4 and falls upon the highly heated surface bricks of the bottom 8. The liquid in coming into contact with the highly heated bottom and inner walls of the muffle is suddenly raised to a very high temperature and begins to foam and boil therein. The introduction of the liquid may be continued until the basin of the muffle chamber is practically filled, whereupon the spout 4 may be withdrawn and the opening 19 closed by the door 20. The calcination process is allowed to continue for a number of hours, which time will vary according to the substance being treated. By this process, however, material which has heretofore required 72 hours to calcine may be properly calcined in about 12 hours. The gas may also be ignited at the pipes 17 within the muffle chamber, which gas burns in a flame over the ceiling of the muffle chamber and a large amount of heat is in this way reflected onto the material below. The operator from time to time rakes and stirs the material with a rake introduced through the opening 22 and as the oxidation takes place the substance is reduced to a dry hard form.

My process has also proven particularly suitable to the calcination of the ores of vanadium, which have to be diluted as above until the composition is nearly as thin as water, and by the method heretofore employed this liquid was first introduced into evaporating pans and after evaporation had taken place the dry substance remained which was then introduced into a calcining furnace. By my improved process, however, the steps of evaporation and calcining are done in one operation, thereby greatly reducing the time and labor.

What I claim is:

The process of calcination consisting in introducing to the furnace the substance to be calcined in a liquid or diluted state to a substantially equal depth at all points, continually exposing the substance during the evaporating and calcining operation to a substantially even heat continuously applied at all points, and calcining equally at all points on the furnace bottom.

In testimony whereof, I the said JOSEPH C. HECKMAN have hereunto set my hand.

JOSEPH C. HECKMAN.

Witnesses:
ROBERT C. TOTTEN,
J. R. KELLER.